United States Patent
Walker et al.

(10) Patent No.: US 10,645,183 B2
(45) Date of Patent: May 5, 2020

(54) REDIRECTION OF CLIENT REQUESTS TO MULTIPLE ENDPOINTS

(71) Applicant: Microsoft Technology Licensing, LLC, Redmond, WA (US)

(72) Inventors: Marc A. Walker, Lake Stevens, WA (US); Ananda Sinha, Issaquah, WA (US); Zhifeng Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 291 days.

(21) Appl. No.: 15/633,476

(22) Filed: Jun. 26, 2017

(65) Prior Publication Data

US 2018/0375950 A1   Dec. 27, 2018

(51) Int. Cl.
*G06F 15/16* (2006.01)
*H04L 29/08* (2006.01)

(52) U.S. Cl.
CPC .......... *H04L 67/2814* (2013.01); *H04L 67/28* (2013.01); *H04L 67/2895* (2013.01); *H04L 67/10* (2013.01); *H04L 67/1078* (2013.01); *H04L 67/2823* (2013.01); *H04L 67/2842* (2013.01)

(58) Field of Classification Search
CPC ............................ H04L 67/2814; H04L 67/28
USPC ................. 709/202–203, 227–228, 231–232
See application file for complete search history.

(56) References Cited

U.S. PATENT DOCUMENTS

| 7,650,392 | B1 | 1/2010 | Goodwin |
| 9,088,555 | B2 | 7/2015 | Koved et al. |
| 9,203,922 | B2 | 12/2015 | Canning et al. |
| 9,288,252 | B2 | 3/2016 | Stroomer et al. |
| 10,153,899 | B2 * | 12/2018 | Henretty ............. H04L 63/0823 |

(Continued)

FOREIGN PATENT DOCUMENTS

| WO | 2012145827 A1 | 11/2012 |
| WO | 2016192866 A1 | 12/2016 |

OTHER PUBLICATIONS

Nelson, Oliver, "Evolution: Scalability Through Reverse Proxy", https://www.mertech.com/overview-reverse-proxying/, Published on: Dec. 10, 2014, 9 pages.

(Continued)

*Primary Examiner* — Bharat Barot
(74) *Attorney, Agent, or Firm* — Mannava & Kang, P.C.

(57) ABSTRACT

According to examples, an apparatus may include a processor and a memory on which is stored machine readable instructions that are to cause the processor to access a request from a client device, and send the request to a first endpoint, in which the first endpoint is configured to generate a first response to the request. The instructions are further to cause the processor to receive the first response from the first endpoint, in which the first response includes redirect information for the request, select, based upon the redirect information, a second endpoint that is configured to generate a second response to the request, send the request to the selected second endpoint, receive the second response from the second endpoint, and send a final response to the client device, the final response including information included in both the first response and the second response.

20 Claims, 5 Drawing Sheets

(56) References Cited

U.S. PATENT DOCUMENTS

| | | | |
|---|---|---|---|
| 2007/0280253 A1* | 12/2007 | Rooholamini | H04L 45/00 370/395.2 |
| 2009/0185494 A1* | 7/2009 | Li | H04L 45/00 370/241 |
| 2013/0254333 A1* | 9/2013 | Lyon | H04L 67/10 709/217 |
| 2015/0180762 A1* | 6/2015 | Medved | H04L 47/10 709/223 |
| 2015/0195354 A1* | 7/2015 | Lyon | H04L 67/10 709/203 |
| 2016/0080328 A1* | 3/2016 | Bollay | H04L 67/14 713/153 |
| 2016/0088023 A1 | 3/2016 | Handa et al. | |
| 2017/0026989 A1* | 1/2017 | Mang | H04L 67/322 |
| 2017/0270495 A1* | 9/2017 | Hardin | H04L 67/02 |
| 2019/0104201 A1* | 4/2019 | Bati | H04L 67/26 |

OTHER PUBLICATIONS

"Reverse Proxy", https://f5.com/glossary/reverse-proxy, Retrieved on: May 16, 2017, 1 page.

* cited by examiner

REDIRECTION OF CLIENT REQUESTS TO MULTIPLE ENDPOINTS

BACKGROUND

A reverse proxy is a service or device (such as a proxy server) that handles incoming requests from clients and interacts with services residing on one or more servers on behalf of the clients. That is, a reverse proxy typically receives a request from a client, determines which service is configured to generate a response to the request, sends the request to the determined service, receives the response from the service, and sends the response to the client. Reverse proxies are commonly used to balance loads on servers for increased scalability and availability, to improve security in a network, and provide failover protection.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
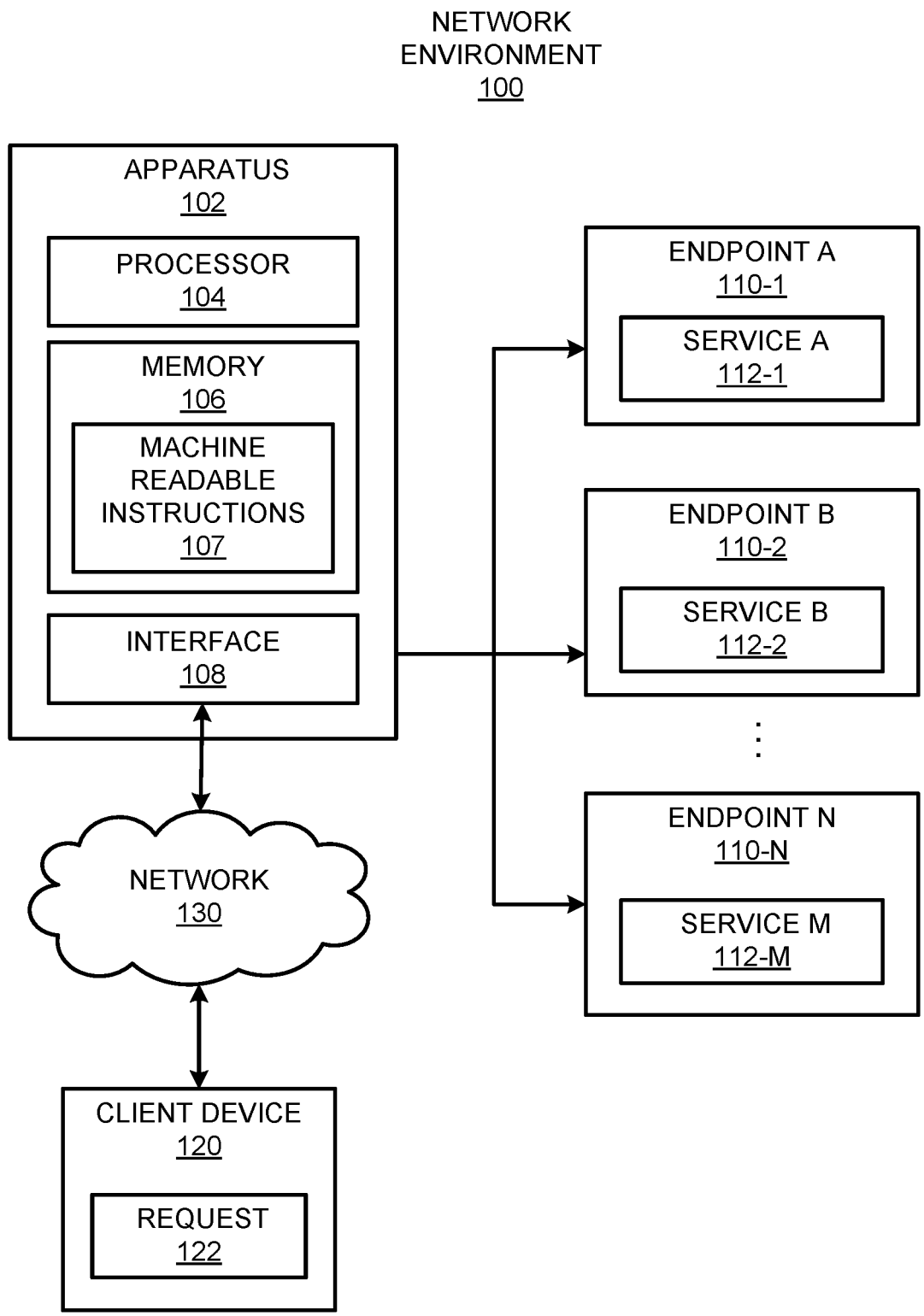
FIG. 1A shows a block diagram of a network environment in which an apparatus for redirecting client requests may be implemented in accordance with an embodiment of the present disclosure.

For simplicity and illustrative purposes, the present disclosure is described by referring mainly to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses and methods for redirecting client requests for services to multiple endpoints in a network. The multiple endpoints may be a cluster of nodes, devices that provide microservices in a microservices network, etc. The multiple endpoints may provide services, e.g., microservices, that may be configured to provide portions of a response to a client request. That is, one of the services, or microservices, may not be configured to provide a complete response to a client request, but instead, multiple endpoints may be called to supply respective portions of the response in order to satisfy, or equivalently, fulfill, the client request. The apparatuses and methods disclosed herein may direct requests to the endpoints and may receive responses from the endpoints until a final response is received and the may send the final response to the client device.

As discussed herein, the apparatus may determine whether a response received from an endpoint indicates that the request is to be sent to a next endpoint. In response to a determination that the response indicates that the request is to be sent to a next endpoint, the apparatus may determine the next endpoint and may send the request to the determined next endpoint. The endpoint that sent the response to the apparatus may include an indication that the request is to be sent to the next endpoint. The apparatus may continue to make these determinations and to send the requests to further endpoints until the apparatus receives the final response. In this regard, the apparatus may receive a client request from a client device and may send the final response to the client device without communicating each of the responses received from the endpoints or receiving each of the requests from the client device.

In conventional networks, a reverse proxy may intercept a client request for a service and may forward the client request to an appropriate endpoint that is configured to process the client request. The endpoint may process the client request to generate a response and may return the response to the reverse proxy. The reverse proxy may also return the response to a client device. In instances in which calls to multiple endpoints are to be made in order to fulfill the request, the client device may submit additional requests as the client device receives partial responses from the endpoints. For instance, as the client device receives each of the partial responses, the client may insert additional information to the subsequent requests such that the reverse proxy may forward the requests to the next appropriate endpoint as each of the subsequent requests is intercepted. In sending the subsequent requests, the client may insert the additional information in a query string, such as a universal resource locator (URL).

As may be noted from the discussion above, conventional reverse proxies may deliver parts of responses, e.g., content, from multiple endpoints or services to a client device through multiple back-and-forth communications with the client device. The multiple back-and-forth communications may require and consume a relatively large amount of bandwidth over a network through which the communications occur as well as processing time of the client device to receive responses and generate further requests. A technical problem associated with conventional reverse proxies may thus be that such multiple communications are required to fulfill client requests for which calls to multiple endpoints are needed. One result of the multiple back-and-forth communications is that the amount of time required to fulfill the client request be increased. Moreover, the multiple back-and-forth communications may lead to increased instances of responses being unsuccessfully delivered to the client device as these communications increase the likelihood that a communication is attempted during a network connection error or other type of error.

In contrast, the apparatuses disclosed herein may avoid the multiple back-and-forth communications with a client device to fulfill a client request that requires calls to be made to multiple endpoints. That is, the apparatuses disclosed herein may determine whether a next endpoint is to receive the request based upon information received from a prior endpoint and may send the request to the next endpoint in response to a determination that the request is to be sent to the next endpoint. The apparatuses disclosed herein may repeat this process until a determination is made that the request is not to be sent to a further endpoint, at which point the apparatuses may send a final response that fulfills the client request to the client device. In this regard, the apparatuses disclosed herein may function as reverse proxies that may intercept a client request and may send a final response to the client device. In addition, the apparatuses disclosed herein may return a complete response to a client request over a smaller number of communications as compared with conventional reverse proxies.

Through implementation of the apparatuses and methods disclosed herein, the number of communications with the client device may significantly be reduced, especially when compared against operations that require a large number of calls to be made to multiple endpoints to fulfill a response. A technical solution to the technical problem discussed above may thus be that the amount of bandwidth and processing required to fulfill and return a complete response to a client request may be reduced. Another technical solution to the technical problem discussed above may be that the rate at which the responses are returned successfully to the client device may be increased, which may also improve the efficiency at which the client device may operate as the client device may not need to submit repeated requests to obtain a complete response to a request.

Reference is made first to FIG. 1A, which shows a block diagram of a network environment 100 in which an apparatus 102 for redirecting client requests may be implemented, in accordance with an embodiment of the present disclosure. It should be understood that the network environment 100 depicted in FIG. 1A may include additional components and that some of the components described herein may be removed and/or modified without departing from scopes of the network environment 100.

As shown in FIG. 1A, the apparatus 102 may include a processor 104, a memory 106, and an interface 108. The apparatus 102 may be a computing device, e.g., a server, a switch, an access point, a gateway, or the like. In addition, the apparatus 102 may be in communication with a plurality of endpoints 110-1 to 110-N, in which the variable "N" may represent a value greater than one. The apparatus 102 may also communicate with a client device 120 via a network 130, which may be a local area network, the Internet, or the like.

The apparatus 102 may communicate with the endpoints 110-1 to 110-N through any suitable communication medium. In examples in which the apparatus 102 and the endpoints 110-1 to 110-N are housed in a common data center, the communication may be performed through a local area network in the data center. In examples in which the apparatus 102 and the endpoints 110-1 to 110-N are housed in multiple data centers, the communication may be performed through a wide area network or the Internet. In other examples, the communication may be performed through a combination of networks.

As shown, the endpoints 110-1 to 110-N may provide services 112-1 to 112-M, in which the variable "M" may represent a value greater than one. The services 112-1 to 112-M may each be a web application, an email application, a search engine application, a web site, etc. In some examples, some of the services 112-116 may be the same version of a service and may thus return the same responses to requests. In these examples, some of the services 112-1 to 112-M may function as backups to each other and/or complementary services to each other. In examples in which the some of the services 112-1 to 112-M provide complementary services to each other, a first service 112-1 may be configured to generate a first portion of a response to a particular request and a third service 112-M may be configured generate a second portion of the response to the particular request. By way of particular example in which the request is a request for data A and data B, the first portion of the response may include data A and the second portion of the response may include data B.

Each of the endpoints 110-1 to 110-N may be a respective server, a respective virtual machine hosted by a server, a respective virtual machine hosted by multiple servers, respective host processes on a virtual machine, respective host processes on multiple virtual machines, or the like. In any regard, the apparatus 102 may function as a reverse proxy for the endpoints 110-1 to 110-N and may thus function as an interface between the client 120 and the endpoints 110-1 and 110-N. Particularly, the memory 106 may store machine readable instructions 107 that cause the apparatus 102 to function as a reverse proxy for the endpoints 110-1 to 110-N. In addition, as discussed in greater detail herein, the machine readable instructions 107 may control delivery of and redirections of requests 122 received from the client device 120. The endpoint 110-1 is depicted as providing a service 112-1, the endpoint 110-2 is depicted as providing a service 112-2, and the endpoint 110-N is depicted as providing a service 112-M for purposes of illustration and should thus not be construed as limiting the endpoints 110-1 to 110-N as providing any particular number of services 112-1 to 112-M.

Users may access the services 112-1 to 112-M deployed on the endpoints 110-1 to 110-M via the client device 120, which may be a desktop, a laptop, a tablet computer, a smart phone, etc. The client device 120 may communicate with the apparatus 102 through the network 130 to submit a request 122 for a service. For instance, the client device 120 may submit a request 122 through an Internet search engine or web portal, e.g., the request may be a query string, a universal resource locator (URL), etc. As another example, the client device 120 may submit a request for particular information via a website. In any regard, the apparatus 102 may receive the request 122 via the interface 108, which may be a hardware interface, a software interface, or a combination of hardware and software.

The processor 104 may execute the machine readable instructions 107 to process information contained in the request 122 to determine which of the endpoints 110-1 to 110-N and/or services 112-1 to 112-M to which the request 122 is to be directed. For instance, the processor 104 may execute the machine readable instructions 107 to determine the service 112-1 from information contained in the request, such as a URL, keywords, type of information requested, etc. The processor 104 may also execute the machine readable instructions 107 to send the request 122 to the endpoint 110-1 on which the determined service 112-1 is provided, to receive a response from the determined endpoint 110-1, and to redirect the request 122 to another endpoint 110-2 based upon information contained in the response from the endpoint 110-1 on which the determined service 112-1 is provided. Various manners in which the memory 106 may execute the machine readable instructions 107 are discussed in greater detail herein.

According to examples, the network environment 100 may be a microservices environment in which the endpoints 110-1 to 110-N are microservice endpoints. The apparatus 102 may support a cluster of the microservice endpoints 110-1 to 110-N, in which the apparatus 102 may understand available infrastructure resources and requirements of the service instances running on the cluster of the microservice endpoints 110-1 to 110-N. In one example, the microservices environment may include the Azure Service Fabric provided by Microsoft Corporation®.

As services in the microservice endpoints, the services 112-1 to 112-M may include partial instructions of the same application such that multiple calls to a plurality of the services 112-1 to 112-M may be made to fulfill a client request 122. As discussed herein, the apparatus 102 may determine which of the services 112-1 to 112-M the client request 122 is to be delivered and the apparatus 102 may deliver the client request 122 to the determined endpoint 110-1 to 110-N. The apparatus 102 may also receive a first response from the determined endpoint 110-1 in which the first response may include redirect information for the request. The apparatus 102 may further determine a next endpoint 110-1 to 110-N to which the client request 122 is to be delivered from the redirect information.

The redirect information may include, for instance, a collection of name\value pairs from which the processor 104 may determine the next endpoint 110-1 to 110-N to call. In one regard, therefore, the processor 104 may not need to know the identities of the endpoints 110-1 to 110-N to which the request is to be communicated to obtain a response that fulfills the request 122. In addition, the services 112-1 to 112-M may not need to know the identity of the endpoint 110-1 to 110-N that provides the next service 112-2 that is to generate a next portion of the response to the client request 122. Instead, the services 112-1 to 112-M may determine the name\value pairs for the request and may insert that information to their responses. As such, for instance, the services 112-1 to 112-M may not identify the next endpoint 110-1 to 110-N and may thus not directly communicate their responses to a next endpoint 110-1 to 110-N. Instead, the services 112-1 to 112-M may send their generated responses to the apparatus 102 and the apparatus 102 may determine the next endpoint 110-1 to 110-N that includes a service 112-1 to 112-M that is configured to generate a next portion of the response.

The processor 104 may continue to determine the next endpoints 110-1 to 110-N and to receive responses from the endpoints 110-1 to 110-N until the processor 104 determines that a final response has been achieved or that a number of redirects exceeds a predetermined threshold count. When either of these conditions is met, the processor 104 may send the final response to the client device 120.

Figure 1B:
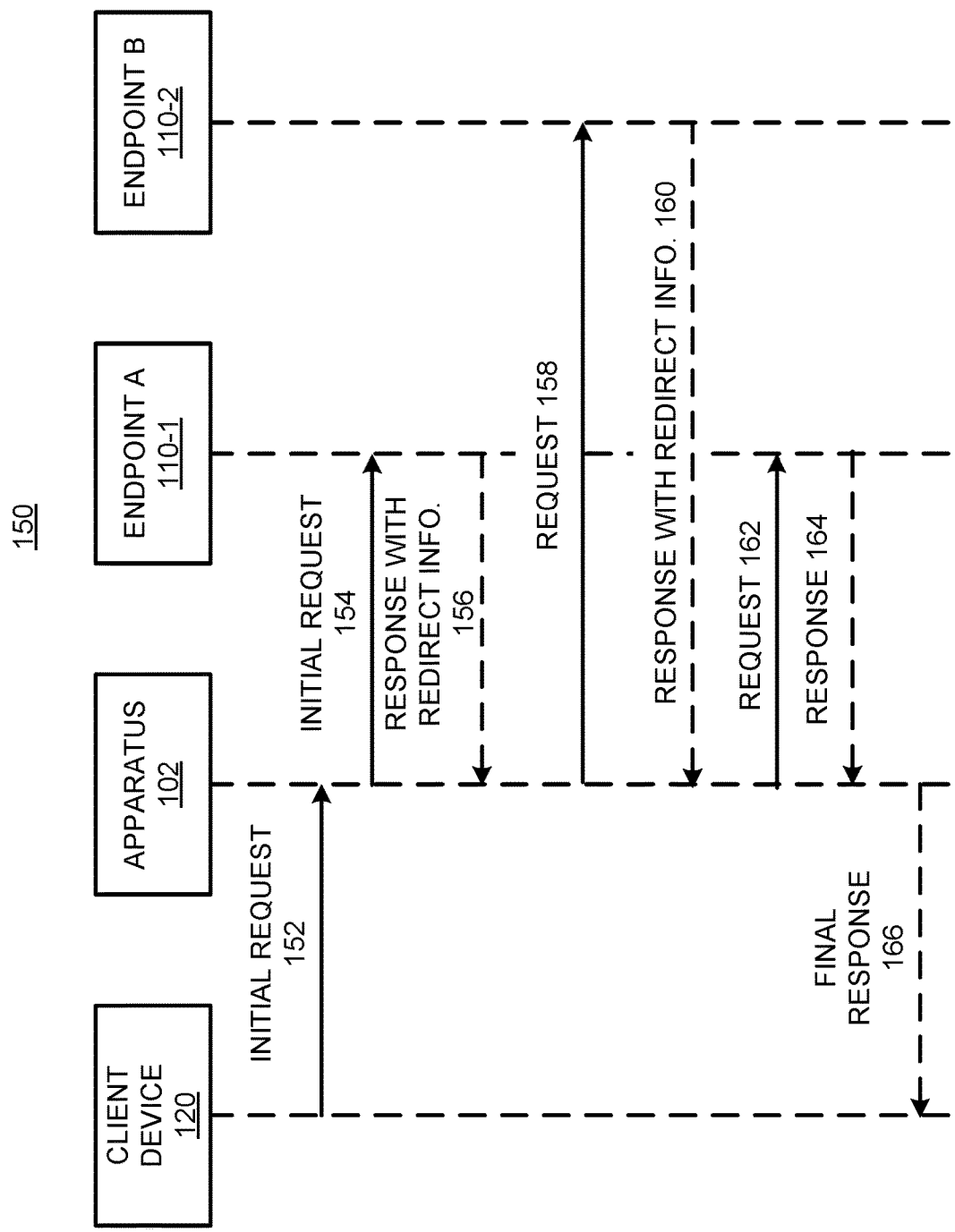
FIG. 1B shows a diagram of a process flow operation that may occur among a client device, the apparatus shown in FIG. 1A, a first endpoint, and a second endpoint in accordance with an embodiment of the present disclosure.

With reference now to FIG. 1B, there is shown a process flow diagram 150 of an operation that may occur among the client device 120, the apparatus 102, a first endpoint 110-1, and a second endpoint 110-2. It should be understood that the process flow diagram 150 depicted in FIG. 1B is an example and that other process flow operations may occur without departing from a scope of the apparatus 102 disclosed herein.

As shown, at 152, the apparatus 102 may receive an initial request from the client device 120. At 154, the apparatus 102 may send the initial request to the first endpoint 110-1 and at 156, the apparatus 102 may receive a response from the first endpoint 110-1. The response may include redirect information that the apparatus 102 may use to select the second endpoint 110-2. As discussed in greater detail herein, the apparatus 102 may select the second endpoint 110-2 from a plurality of candidate endpoints 112-1 to 112-M based upon the redirect information as well as other considerations, such as load balancing considerations. That is, for instance, the apparatus 102 may select a second endpoint 110-2 from a plurality of candidate endpoints 112-1 to 112-M that are each configured to generate a second portion of the response to the request. In addition, where there are multiple candidate endpoints 112-1 to 112-M, the apparatus 102 may select one of the multiple endpoints 112-1 to 112-M based upon load balancing considerations. For instance, the apparatus 102 may select the least loaded endpoint of the multiple candidate endpoints 112-1 to 112-M.

In any regard, at 156, the first endpoint 110-1 may also send first information that is responsive to the request in the response. That is, for instance, the response from the first endpoint 110-1 may include a first portion of the response to the request. At 158, the apparatus 102 may send the request to the selected second endpoint 110-2. Prior to sending the request, the apparatus 102 may insert the first information included in the response received from the first endpoint 110-1 into the request. At 160, the apparatus 102 may receive a second response from the second endpoint 110-2. The second response may also include redirect information, which the apparatus 102 may use to select a further endpoint that is to receive the request. The second response may further include second information that is responsive to the request. In some examples, the second endpoint 110-2 may utilize the first information in generating the second information included in the second response.

In the example shown in FIG. 1B, the redirect information may cause the apparatus 102 to send the request back to the first endpoint 110-1. The request may also include the second information received with the second response. In addition, the first endpoint 110-1 may generate another response, which may be a final response to the request. The first endpoint 110-1 may generate the other response from the second information. At 164, the first endpoint 110-1 may send the other response to the apparatus 102. At 166, the apparatus 102 may output the final response to the client device 120. In some examples, 162 and 164 may be omitted and the second response received from the second endpoint 110-2 may be the final response.

According to examples, the apparatus 102 may cache the first response with the redirect information received from the first endpoint 110-1. In these examples, when the apparatus 102 receives another request at 152, instead of sending the initial request to the first endpoint 110-1, the apparatus 102 may access the first response from the cache and may thus bypass 154 and 156. The apparatus 102 may also use the redirect information contained in the cached first response to redirect the request to the second endpoint 110-2 at 158. By way of example, the apparatus 102 may identify the first response corresponding to the request through a cache lookup using the information contained in the request. The information contained in the request may include, for instance, a tenant identifier, a cookie that is persisted on the client device 120, part of an authorization token that is used for multiple services, or the like.

Figure 2:
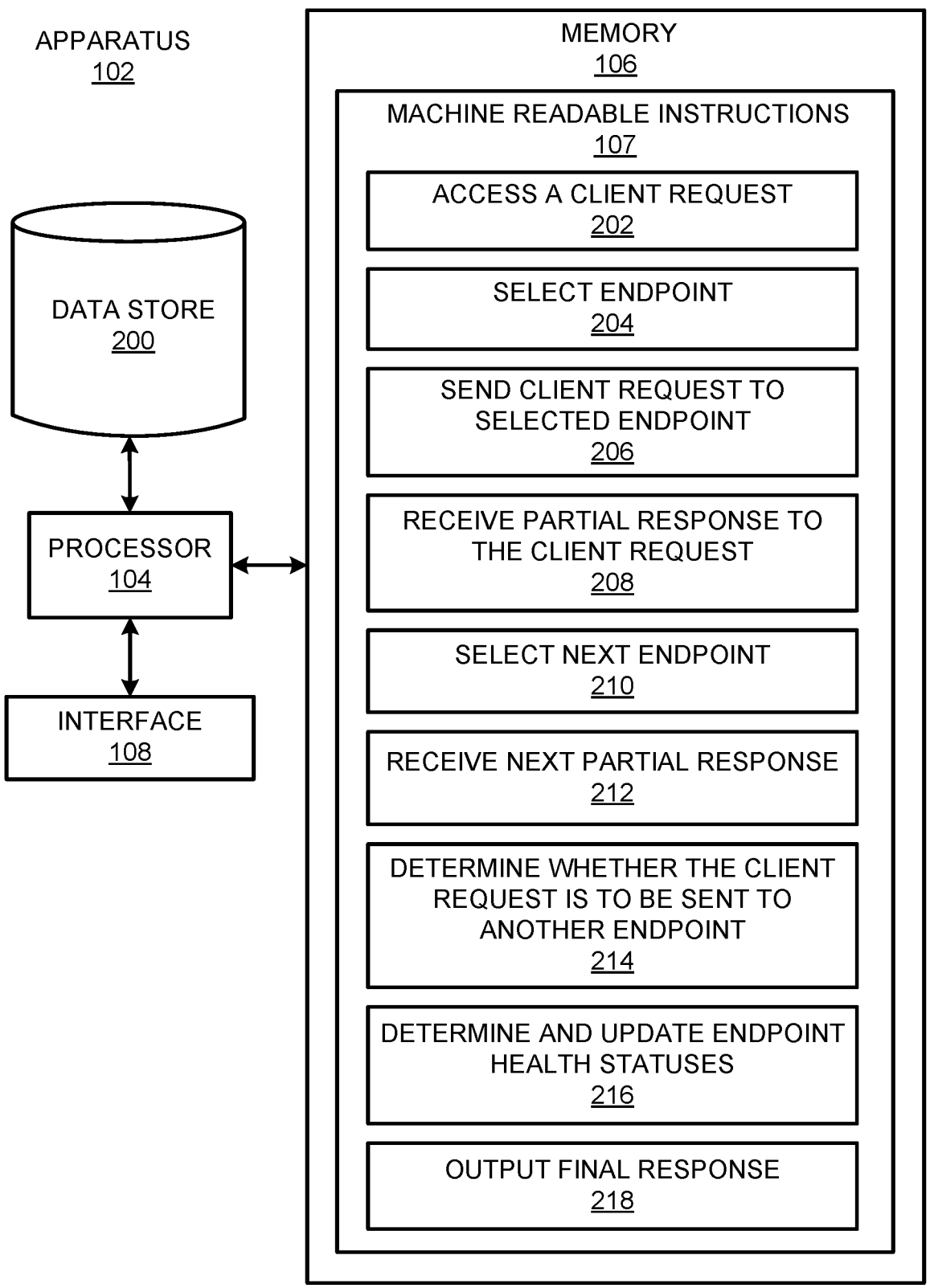
FIG. 2 shows a block diagram of the apparatus depicted in FIG. 1A in accordance with an embodiment of the present disclosure.

Turning now to FIG. 2, there is shown a block diagram of the apparatus 102 depicted in FIG. 1A. As such, the apparatus 102 may include the processor 104, the memory 106, and the interface 108. The processor 104, which may control operations of the apparatus 102, may be a semiconductor-based microprocessor, a central processing unit (CPU), an application specific integrated circuit (ASIC), a field-programmable gate array (FPGA), and/or other suitable hardware device. The processor 104 may access a data store 200, which may be a Random Access Memory (RAM), an Electrically Erasable Programmable Read-Only Memory EEPROM), a storage device, an optical disc, and the like. The processor 104 may also access the interface 208 through which the processor 108 may communicate with client devices 120 and the endpoints 110-1 to 110-N.

The memory 106 may have stored thereon machine readable instructions 107 (which may also be termed computer readable instructions) that the processor 104 may execute. The memory 106 may be an electronic, magnetic, optical, or other physical storage device that contains or stores executable instructions. The memory 106 may be, for example, Random Access memory (RAM), an Electrically Erasable Programmable Read-Only Memory (EEPROM), a storage device, an optical disc, and the like. The memory 106, which may also be referred to as a computer readable storage medium, may be a non-transitory machine-readable storage medium, where the term "non-transitory" does not encompass transitory propagating signals.

The processor 104 may fetch, decode, and execute the instructions 202 to access a client request 122. The processor 104 may fetch, decode, and execute the instructions 204 to select an endpoint 110-1 to 110-N to which the client request 122 is to be sent. The processor 104 may fetch, decode, and execute the instructions 206 to send the client request 122 to the selected endpoint 110-1. The processor 104 may fetch, decode, and execute the instructions 208 to receive a partial response to the client request 122 from the selected endpoint 110-1. The processor 104 may fetch, decode, and execute the instructions 210 to select a next endpoint 110-2 based upon the redirect information contained in the received partial response. The processor 104 may fetch, decode, and execute the instructions 212 to receive a next partial response from the next selected endpoint 110-2. The processor 104 may fetch, decode, and execute the instructions 214 to determine whether the client request 122 is to be sent to another endpoint 110-3 to 110-N. The processor 104 may fetch, decode, and execute the instructions 216 to determine and update statuses of the endpoints 110-1 to 110-N. The processor 104 may fetch, decode, and execute the instructions 218 to output a final response to the client device 120.

Figure 3:
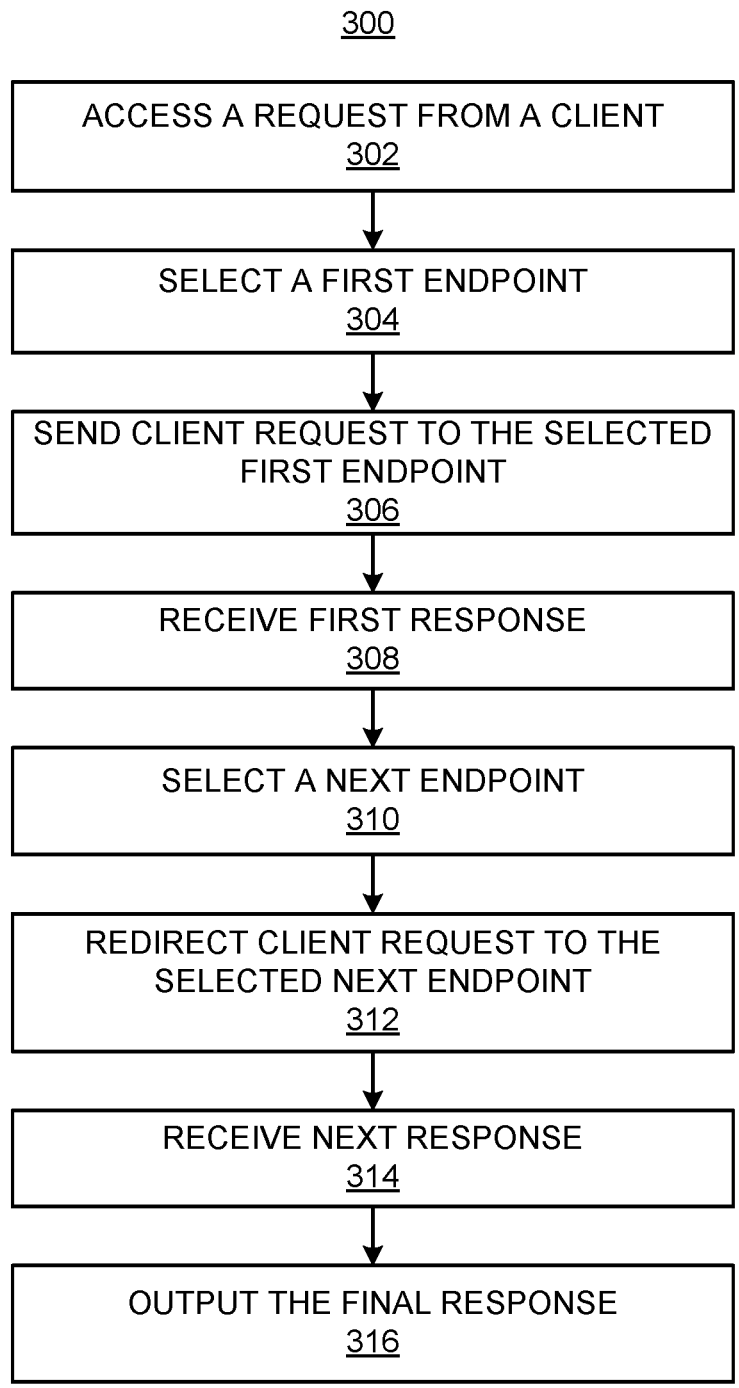
FIGS. 3 and 4, respectively, depict flow diagrams of methods for fulfilling a client request by redirecting the client request to multiple endpoints that are configured to generate partial responses to the client request in accordance with embodiments of the present disclosure.
Figure 4:
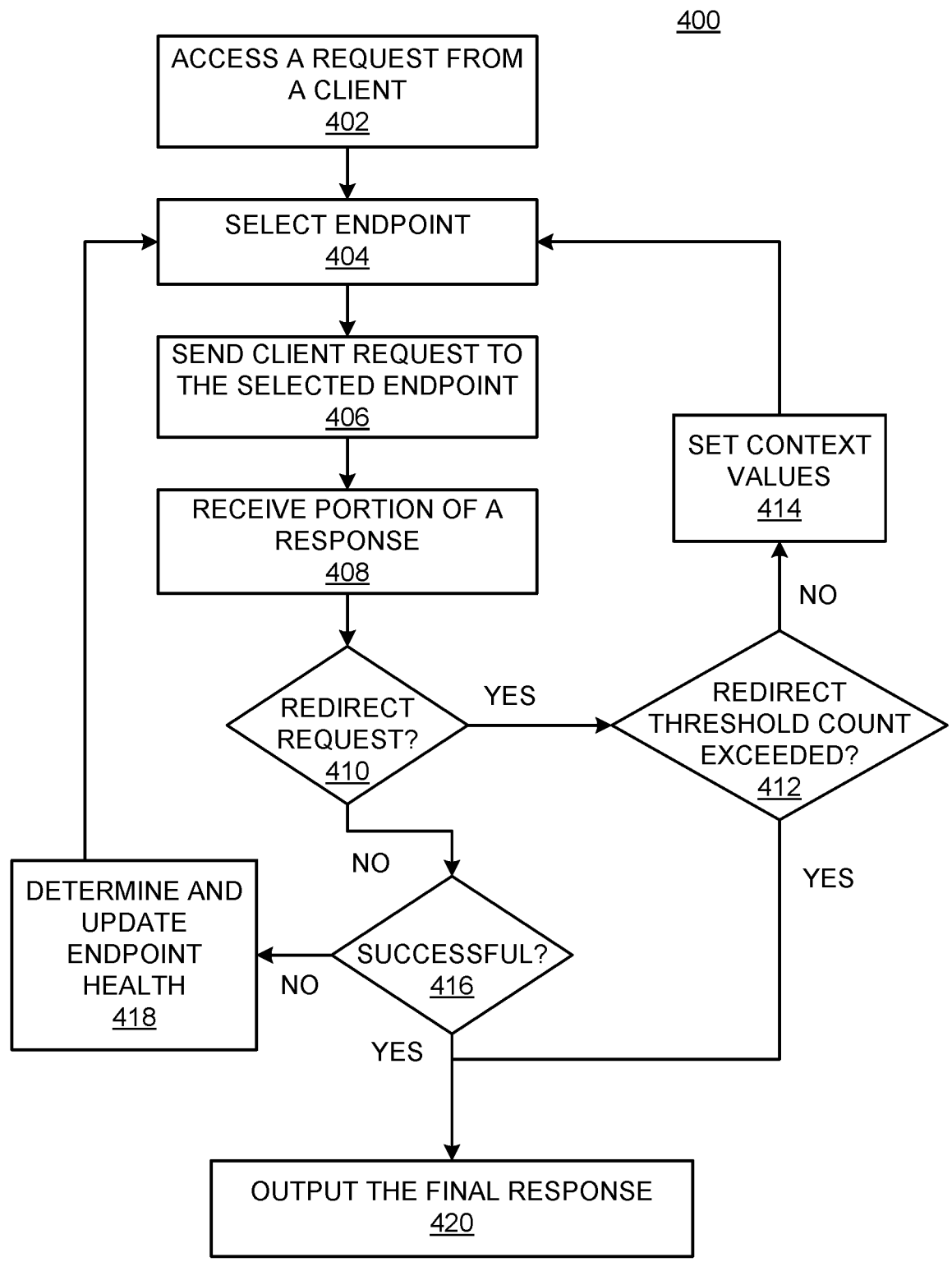

Various manners in which the processor 104 may operate to redirect a client request 122 to multiple endpoints 110-1 to 110-N, e.g., multiple microservice endpoints 112-1 to 112-M, to fulfill the client request 122 are discussed in greater detail with respect to the methods 300 and 400 depicted in FIGS. 3 and 4. Particularly, FIGS. 3 and 4, respectively, depict flow diagrams of methods 300 and 400 for fulfilling a client request 122 by redirecting the client request 122 to multiple endpoints 110-1 to 110-N that are configured to generate partial responses to the client request 122. It should be understood that the methods 300 and 400 depicted in FIGS. 3 and 4 may include additional operations and that some of the operations described therein may be removed and/or modified without departing from scopes of the methods 300 and 400. The descriptions of the methods 300 and 400 are also made with reference to the features depicted in FIGS. 1A and 2 for purposes of illustration.

In the following descriptions of the methods 300 and 400, particular reference is made to the selection of and communication with endpoints 110-1 to 110-N. It should however be noted that the references may instead be directed to the services 112-1 to 112-M that the endpoints 110-1 to 110-N provide, without departing from scopes of the methods 300, 400. Accordingly, particular references made to the endpoints 110-1 to 110-N may be construed as equivalently being directed to the services 112-1 to 112-M, which may be microservices 112-1 to 112-M as discussed above. Additionally, particular references to the services 112-1 to 112-M may be construed as equivalently being directed to the endpoints 110-1 to 110-N.

At block 302, the processor 202 may execute the instructions 202 to access a client request 122. For instance, a client device 120 may submit a request 122 via the network 130 and the processor 202 may store the request 122 in the data store 200. The processor 202 may also access the request 122 from the data store 200 or from another data storage location.

At block 304, the processor 202 may execute the instructions 204 to select a first endpoint 110-1 that is configured to generate a first response to the request 122. That is, the processor 202 may select an endpoint 110-1 that provides a service 112-1 (or equivalently, a microservice 112-1) that is configured to generate the first response to the request 122. For instance, the processor 104 may select the first service 112-1 from information contained in the request 122, such as a tenant id, client information, etc. That is, the processor 104 may select a first service 112-1 that has the appropriate instructions to respond to a portion of the request. In instances in which multiple services 112-1 to 112-M have the appropriate instructions to respond to the portion of the request, the processor 104 may select one of multiple services 112-1 to 112-M based upon a policy. For instance, the processor 104 may select the service 112-1 from among the multiple services 112-1 to 112-M to balance loads across the multiple services 112-1 to 112-M, based upon a random distribution scheme, based upon a round robin distribution scheme, etc.

At block 306, the processor 104 may execute the instructions 206 to send the client request 122 to the selected first endpoint 110-1. Particularly, the processor 104 may send the client request 122 to a selected service 112-1 provided by the selected first endpoint 110-1. In addition, the selected service 112-1 may process the request to generate a first response to the request, e.g., the selected service 112-1 may generate a first portion of a complete response to the request. The selected service 112-1 may also identify redirect information for another portion of the response and may insert the identified redirect information into the first response along with the first portion of the response. The redirect information may be name\value pairs that the processor 104 may use to determine the next endpoint to which the request is to be sent. In addition, the redirect information may be included in a packet header.

At block 308, the processor 104 may execute the instructions 208 to receive the first response from the first endpoint 110-1. The first response may be a partial response or a portion of a response to the client request 122. According to examples, the first endpoint 110-1 may insert response artifacts into the response. The response artifacts may include a first header, e.g., x-ms-redirectinfo, that includes a collection of name\value pairs that may be added to the context for calculation of a next endpoint for the request. The format of this response artifact may be "x-ms-redirectinfo:<name>=<value>;<name2>=<value2>." The response artifacts may also include a second header, e.g., x-ms-redirectblob, that includes data that is to be directly passed in the next request, which the processor 104 may ignore. The format of this response artifact may be "x-ms-redirectblob:<Some important data passed to the next call.>". The response artifacts may further include a bit field that indicates that the request is a redirect, e.g., x-ms-redirectblob. The processor 104 may remove the response artifacts prior to sending the final response to the client device 120.

At block 310, the processor 104 may select a next endpoint 110-2 that is configured to generate a second response to the request 122, which may be another partial response to the client request 122. Particularly, the processor 104 may select an endpoint 110-2 that provides a service 112-2 (or equivalently, a microservice 112-2) that is configured to generate the second response to the request 122. The processor 104 may analyze the redirect information contained in the first response to select the next endpoint 110-2. That is, for instance, the processor 104 may select the next endpoint 110-2 based upon the name\value pairs identified in the first response. Particularly, the processor 104 may add the name\value pairs into a processing context that includes other information such as header values, URL path segments, http cookie values, etc., and the processor 104 may select the next endpoint 110-2 through use of the processing context.

At block 312, the processor 104 may execute the instructions 206 to redirect the client request 122 to the selected next endpoint 110-2. The communication of the client request 122 to the selected next endpoint 110-2 is described herein as a redirection of the client request 122 because the first response may not be communicated to the client device 120. Instead, the processor 104 may redirect the client request 122 to the next endpoint 110-2. In any regard, the processor 104 may send the client request 122 to a selected service 112-2 provided by the selected next endpoint 110-1. In addition, the selected service 112-2 may process the request to generate a second response to the request, e.g., the selected service 112-2 may generate a second portion of a complete response to the request. The selected service 112-2 may also identify redirect information for another portion of the response and may insert the identified redirect information into the second response along with the second portion of the response. The redirect information may be name\value pairs that the processor 104 may use to determine the next endpoint to which the request is to be sent.

As discussed herein, the services 112-1 and 112-2 may be microservices of a common application and thus, the processor 104 may call each of the services 112-1 and 112-2 in the order identified by the redirect information to obtain a complete response to a request 122. That is, each of the services 112-1 and 112-2 may be configured to provide a portion of the response. In addition, the next service 112-2 may use information from the first service 112-1 included in the first response to generate the second response. Moreover, the first service 112-1 may use information from the second service 112-2 to generate a further response, e.g., the final response to the request 122. In this regard, the requests may include the information that the first service 112-1 and the second service 112-2 generated and included in the responses. However, the processor 104 may not access or analyze this information in the responses and requests.

At block 314, the processor 104 may receive the next response from the endpoint 110-2 that provides the second service 112-2. The second response may be another partial response to the client request 122. In some instances, the second response, along with the first response, may fulfill the request. In other instances, a further response that is a further partial response to the client request 122 may be required to fulfill the request. In these instances, the second service 112-2 may insert a second redirect information into the second response and the processor 104 may select a further service 112-3 that is configured to generate the further response. The processor 104 may additionally send the request to the selected further service 112-3 and may receive the further response from the further service 112-3. This process may be repeated until the processor 104 has received each of the responses to fulfill the request.

At block 316, in response to the processor 104 determining that the received responses fulfill or satisfy the request 122, the processor 104 may execute the instructions 218 to output a final response to the request 122. That is, for instance, the processor 104 may determine that the received responses fulfill or satisfy the request 122 in response to a determination that the last received response does not include redirect information. The final response may be the last response that the processor 104 received from the endpoint with which the processor 104 most recently communicated. For instance, the endpoint that communicated the last response may generate the final response using the information contained in the prior responses and any further information that the endpoint has included into the final response. Additionally, prior to sending the final response, the processor 104 may remove the response artifacts that were added to the responses during redirection of the requests among the endpoints 110-1 to 110-N.

With reference now to FIG. 4, at block 402, the processor 104 may execute the instructions 202 to access a client request 122. The processor 104 may access the client request 122 in similar manners to those discussed above with respect to block 302 in FIG. 3. In addition, the processor 104 may extract artifacts from the client request 122. For instance, the processor 104 may identify tenant or client information, e.g., a tenant ID, an application ID, a data domain, target slices, etc., from the client request 122. In addition, the processor 104 may perform a cache lookup to set additional context values in the request 122. The context values may include appropriate name\value pairs that the processor 104 may use to select the endpoint to which the request 122 is to be sent.

At block 404, the processor 104 may execute the instructions 204 to select an endpoint 110-1 that is configured to generate a first portion of a response to the request 122. The processor 104 may select the endpoint 110-1 in similar manners to those discussed above with respect to block 304 in FIG. 3.

At block 406, the processor 104 may execute the instructions 206 to send the client request 122 to the selected first endpoint 110-1. The processor 104 may send the request 122 to the endpoint 110-1 in similar manners to those discussed above with respect to block 306 in FIG. 3.

At block 408, the processor 104 may execute the instructions 208 to receive the first portion of the response from the endpoint 110-1. The first portion of the response may be a partial response to the client request 122.

At block 410, the processor 104 may execute the instructions 210 to determine whether the first portion of the response includes a redirect request. The processor 104 may determine whether the first portion of the response includes a redirect request based upon whether the first portion of the response includes redirect information. That is, the processor 104 may determine that the first portion of the response includes a redirect request in response to the first portion of the response including redirect information. Likewise, the processor 104 may determine that the first portion of the response does not include a redirect request in response to the first portion of the response lacking redirect information.

In response to a determination at block 410 that the first portion of the response includes a redirect request, the processor 104 may execute the instructions 214 to determine whether the client request 122 is to be sent to another endpoint. For instance, as indicated at block 412, the processor 104 may determine whether a number of redirects that the processor 104 has already implemented for the request exceeds a predetermined threshold count. Generally speaking, the processor 104 may implement block 412 to prevent the request from performing a continuous loop of redirects such as may occur when an endpoint is malfunctioning. In any regard, the predetermined threshold count may be set to a certain number and the count of redirects may be incremented each time a received response is determined to include a redirect request at block 410. The certain number may user-defined, based upon a testing, based upon an acceptable number of redirects, or the like.

In response to a determination at block 412 that the redirect threshold count has not been exceeded, at block 414, the processor 104 may execute the instructions 210 to set context values for the request. The context values may include appropriate name\value pairs that the processor 104 may use to select the next endpoint to which the request 122 is to be sent.

Following block 414, the processor 104 may repeat blocks 404-410 for a next endpoint 404. In addition, the processor 104 may repeat blocks 412 and 414 in response to a determination at block 410 that a response received at block 408 includes a redirect request and that the redirect threshold count has not been exceeded at block 412.

Referring back to block 410, in response to a determination that the last received response does not include a redirect request, the processor 104 may execute the instructions 216 to determine whether the last received response was successful. That is, for instance, the processor 104 may determine whether the last received response contained an error, e.g., whether the last received response improperly did not include redirect information. Particularly, for instance, the processor 104 may determine the success of the response through an analysis of the httpstatus code for HTTP/TCP requests of the received response and/or based upon the absence of a redirect information header in the response. In response to a determination that the last received response was not successful, the processor 104 may execute the instructions 216 to determine and update a health status of the endpoint that communicated the last response. That is, for instance, the processor 104 may store an indication that the endpoint that communicated the last response has malfunctioned such that the endpoint may be avoided until a determination is made that a function has been corrected. In addition, the processor 104 may select another endpoint based upon the redirect information contained in a prior response at block 404 to generate the portion of the response that the last endpoint did not properly generate.

The processor 104 may further repeat blocks 404-418 until the processor 104 determines at block 412 that the redirect threshold count has been exceeded or determines at block 416 that the last received response that does not include a redirect request is successful. Following either of the "yes" conditions at blocks 412 and 416, the processor 104 may execute the instructions 218 to output a final response to the client device 120. According to examples, the final response may be the most recently received response.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine readable instructions that are to cause the processor to:
access a request from a client device;
send the request to a first endpoint, wherein the first endpoint is configured to generate a first response to the request;
receive the first response from the first endpoint, wherein the first response includes redirect information for the request, wherein the redirect information includes a collection of name/value pairs from which the processor is to determine a second endpoint;
determine, based upon a calculation using the name/value pairs received from the first endpoint, the second endpoint that is configured to generate a second response to the request, wherein the second endpoint is determined from a plurality of candidate endpoints;
send the request to the selected second endpoint;
receive the second response from the second endpoint; and
send a final response to the client device, the final response including information included in both the first response and the second response.

2. The apparatus according to claim 1, wherein the instructions are further to cause the processor to add the name/value pairs in the received redirect information into a processing context to determine the second endpoint from the plurality of candidate endpoints.

3. The apparatus according to claim 1, wherein the second response includes second redirect information, and wherein to process the second response, the instructions are further to cause the processor to:
select, based upon the second redirect information, a further endpoint that is configured to generate a further response;
send the request to the selected further endpoint;
receive the further response from the further endpoint; and
wherein the final response includes information from the further response.

4. The apparatus according to claim 3, wherein the second response includes second redirect information, and wherein to process the second response, the instructions are further to cause the processor to:
select, based upon the second redirect information, the first endpoint, wherein the first endpoint is configured to generate the further response from information contained in the second response; and
receive, from the first endpoint, the further response.

5. The apparatus according to claim 1, wherein the first response includes partial information that satisfies a portion of the request, and wherein the instructions are further to cause the processor to:
  insert the partial information into the request; and
  send the request with the partial information to the determined second endpoint.

6. The apparatus according to claim 5, wherein the second response includes second partial information that satisfies a second portion of the request, and wherein the instructions are further to cause the processor to:
  insert the second partial information into the request;
  send the request with the second partial information to the first endpoint, wherein the first endpoint is configured to process the second partial information to generate a third response;
  receive the third response; and
  wherein the final response includes information from the third response.

7. The apparatus according to claim 5, wherein the second response includes second partial information that satisfies a second portion of the request, and wherein the instructions are further to cause the processor to:
  prepare the final response to include the partial information from the first endpoint and the second partial information from the second endpoint; and
  wherein the first endpoint and the second endpoint provide microservices of a service.

8. The apparatus according to claim 1, wherein the instructions are further to cause the processor to:
  determine whether responses received from a plurality of endpoints are successful responses to the request;
  determine, based upon the determination as to whether the responses are successful responses to the request, health statuses of the plurality of endpoints; and
  record the determined health statuses.

9. The apparatus according to claim 1, wherein the instructions are further to cause the processor to:
  determine whether a number of redirects to a plurality of endpoints exceeds a predetermined threshold count; and
  in response to a determination that the number of redirects exceeds the predetermined threshold count, cease delivery of the request to an additional endpoint.

10. A method comprising:
  accessing, by a processor, a request from a client;
  selecting, by the processor, a first endpoint that is configured to generate a first portion of a response to the request;
  sending the request to the selected first endpoint;
  receiving the first portion of the response from the first endpoint, the first portion of the response including redirect information for the request and a bit field that indicates that the request is to be redirected to another endpoint;
  selecting, by the processor and based upon the redirect information and the bit field indicating that the request is to be redirected to another endpoint, a second endpoint that is configured to generate a second portion of the response to the request, wherein the second endpoint is selected from a plurality of candidate endpoints;
  redirecting the request to the second endpoint;
  receiving the second response from the second endpoint; and
  outputting a final response to the client, the final response including information from the first portion of the response and the second portion of the response.

11. The method according to claim 10, wherein the second portion of the response includes second redirect information, said method further comprising:
  selecting, based upon the second redirect information, a third endpoint that is configured to generate a third portion of the response;
  sending the request to the selected third endpoint;
  receiving the third portion of the response from the third endpoint;
  determining whether the third portion of the response includes third redirect information; and
  in response to a determination that the third portion of the response does not include third redirect information, determining whether the final response is a successful response to the request.

12. The method according to claim 11, further comprising:
  in response to a determination that the final response is not a successful response to the request,
    recording a health of the further endpoint;
    selecting a replacement endpoint that is configured to generate the third portion of the response;
    sending the request to the selected replacement endpoint;
    receiving the third portion of the response from the replacement endpoint; and
    wherein the final response includes information from the third portion of the response from the replacement endpoint.

13. The method according to claim 11, wherein outputting the final response further comprises outputting the final response in response to a determination that the final response is a successful response to the request.

14. The method according to claim 10, further comprising:
  receiving a subsequent portion of the response that is subsequent to the second portion of the response from a subsequent endpoint;
  determining that the subsequent portion of the response includes subsequent redirect information;
  determining whether a redirect count of the request exceeds a predetermined redirect count;
  in response to a determination that the redirect count does not exceed the predetermined redirect count, sending the request to a second subsequent endpoint that is configured to generate a second subsequent portion of the response to the request; and
  receiving the second subsequent portion of the response from the second subsequent endpoint.

15. The method according to claim 14, further comprising:
  in response to a determination that the redirect count exceeds the predetermined redirect count, outputting the final response with information included in the subsequent portion of the response.

16. A non-transitory computer readable medium on which is stored machine readable instructions that when executed by a processor, cause the processor to:
  receive a request from a client device;
  identify a first microservice that is configured to generate a first portion of a response to the request;
  send the request to the identified first microservice;
  receive the first portion of the response from the first microservice, the first portion of the response including redirect information for the request, wherein the redirect information includes a collection of name/value pairs from which the processor is to determine a second microservice;

select, according to a calculation using the name/value pairs received from the first microservice, the second microservice that is configured to generate a second portion of the response to the request, wherein the second microservice is selected from a plurality of candidate microservices;

redirect the request to the second microservice;

receive the second portion of the response from the second microservice; and output a final response the client device, the final response including information form the first portion of the response and the second portion of the response.

17. The non-transitory computer readable medium according to claim 16, wherein the instructions are further to cause the processor to:

add the name/value pairs in the received redirect information into a processing context to determine to select the second microservice from the plurality of candidate microservices based upon the collection of name\value pairs.

18. The non-transitory computer readable medium according to claim 16, wherein the instructions are further to cause the processor to:

include the information in the first portion of the response into the request prior to redirecting the request to the second microservice.

19. The non-transitory computer readable medium according to claim 16, wherein the instructions are further to cause the processor to:

determine whether a plurality of partial responses to the request received from a plurality of microservices are successful partial responses to the request;

determine, based upon the determination as to whether the plurality of partial responses are successful partial responses to the request, health statuses of the plurality of microservices; and record the determined health statuses of the plurality of microservices.

20. The non-transitory computer readable medium according to claim 16, wherein the instructions are further to cause the processor to:

determine whether a number of redirects to a plurality of microservices exceeds a predetermined threshold count; and in response to a determination that the number of redirects exceeds the predetermined threshold count, cease delivery of the request to an additional microservice.

\* \* \* \* \*